United States Patent [19]
Kato

[11] Patent Number: 4,959,685
[45] Date of Patent: Sep. 25, 1990

[54] IMAGE FORMING APPARATUS PROVIDED WITH A SHEET STORING UNIT

[75] Inventor: Akio Kato, Osaka, Japan
[73] Assignee: Minolta Camera Kabushiki Kaisha, Osaka, Japan

[21] Appl. No.: 488,421
[22] Filed: Feb. 27, 1990

Related U.S. Application Data

[63] Continuation of Ser. No. 394,654, Aug. 16, 1989, abandoned.

[30] Foreign Application Priority Data

Aug. 19, 1988 [JP] Japan ................................ 63-206958
Aug. 19, 1988 [JP] Japan ................................ 63-206959
Aug. 19, 1988 [JP] Japan ................................ 63-206960

[51] Int. Cl.[5] ................................ G03B 27/58
[52] U.S. Cl. ................................ 355/72; 271/214; 271/215; 271/217; 271/314
[58] Field of Search ................................ 355/72, 27; 271/217, 271/214, 215, 314

[56] References Cited

U.S. PATENT DOCUMENTS 3,682,328 8/1972 Turner et al. .
3,685,712 8/1972 Turner et al. .
3,690,537 9/1972 Turner et al. .
4,557,595 12/1985 Freundt ................................ 355/72
4,569,514 2/1986 Holtje .
4,601,570 7/1986 Bartz et al. ................................ 355/72
4,718,657 1/1988 Otter et al. .
4,801,133 1/1989 Ishiguro et al. .
4,811,048 3/1989 Ishikawa et al. .
4,843,434 6/1989 Lawrence et al. ................................ 355/72
4,852,867 8/1989 Johdai et al. .
4,855,787 8/1989 Hashimoto et al. .
4,864,350 9/1989 Ishiguro et al. .
4,886,259 12/1989 Ishikawa et al. .
4,893,152 1/1990 Ishiguro et al. .
4,901,994 2/1990 Ishiguro et al. .
4,905,053 2/1990 Matsuo et al. .
4,905,055 2/1990 Higaki .

FOREIGN PATENT DOCUMENTS 60-31463 2/1985 Japan .
60-206769 9/1986 Japan .
61-295970 12/1986 Japan .

*Primary Examiner*—Monroe H. Hayes
*Attorney, Agent, or Firm*—Burns, Doane, Swecker & Mathis

[57] ABSTRACT

An image forming apparatus comprising a tray for receiving sheets with an image, which is movable up toward and down away from a sheet ejection portion of a transport path, the tray being moved down intermittently in accordance with the volume of sheets stacked thereon. When a signal commanding an image forming operation is generated, the tray is moved to a proper position, where the upper surface of the tray or the upper surface of sheets stacked thereon is positioned below the sheet ejection portion with a specified space, and during the movement of the tray, the image forming operation is kept standing by. The tray is moved to the proper position when the volume of the sheet stack is varied during the image forming operation. The transport path for leading sheets ejected from a copying machine to the tray comprises a first transport section for ejecting sheets onto the tray and a second transport section arranged upstream of the first transport section, and when a sheet is about to be ejected to the tray, the travel speed of the sheet is reduced from a first speed to a second speed. When the next sheet comes into the second transport section during the transportation of the former sheet in the first transport section at the second speed, the travel speed of the former sheet in the first transport section is returned to the first speed.

10 Claims, 16 Drawing Sheets

IMAGE FORMING APPARATUS PROVIDED WITH A SHEET STORING UNIT

This application is a continuation, of application Ser. No. 394,654, filed Aug. 16. 1989 now abandoned.

BACKGROUND OF THE INVENTION

1. Field of the Invention

The present invention relates to an image forming apparatus, and more specifically, an image forming apparatus provided with a sheet storing unit wherein sheets with an image are stacked and stored.

2. Description of Related Art

Regarding a tray wherein sheets ejected from an image forming apparatus such as a copying machine, a laser printer, etc. are stored, in order to store a volume of sheets thereon, a type of tray which is moved down by elevate means in accordance with the volume of sheets stacked thereon has been commercialized. The tray is moved down so that the space between a sheet receiving portion of the tray and a sheet ejection portion (a nipping portion formed of pairs of ejection rollers) can be fixed in spite of variety of the volume of sheets stacked on the tray, and alignment of sheets on the tray can be stable.

This type of sheet storing apparatus was already disclosed, for example, in Japanese Patent Laid Open Publication No. 61-295970. A sheet storing apparatus disclosed in the publication further has a shifting function for dividing sheets right and left.

In this type of sheet storing apparatus, a tray is first moved up to the top position when a copying operation is about to start, and if sheets remain on the tray at that time, the copying operation is kept stand by. However, such a thing often happens, for example, in a case of an interrupt copying operation, and the inhibition of the copying operation in this case is inconvenient. Also, when all or some of sheets stacked on the tray are taken away therefrom during a copying operation, the successive sheets will be received by the tray at a lower position than a proper position, therefore causing disorder of sheets on the tray.

Incidentally, recently, an image forming operation in an image forming apparatus is getting faster. If sheets are ejected from the image forming apparatus onto a tray at a high speed, the sheets will jump up and push other sheets stacked on the tray, therefore resulting in disorder of sheets on the tray. As a countermeasure, Japanese Patent Laid Open Publication No. 60-31463 suggests the speed of a transportation system be reduced immediately before each sheet is ejected onto the tray. In executing such a speed control, if the timing of the slow-down delays on account of a slip of the former sheet, etc., the interval between the former sheet and the latter sheet will be small, and there is a fear of a paper jam.

SUMMARY OF THE INVENTION

It is, therefore, an object of the present invention to provide an image forming apparatus wherein at the beginning of an image forming operation, a tray is moved to a proper position whether sheets remain on the tray or not, thereby improving the convenience.

Another object of the present invention is to provide an image forming apparatus wherein a position of a tray can be adjusted during an image forming operation so that the image forming apparatus can effectively react when sheets are taken away from the tray during the image forming operation.

Further, another object of the present invention is to provide an image forming apparatus wherein the speed of a transportation system is reduced on ejecting sheets onto the tray so that the alignment of sheets on the tray can be improved, and a paper jam can be effectively prevented.

To attain the objects above, an image forming apparatus according to the present invention comprises a tray for receiving sheets, which is movable up toward and down away from a sheet ejection portion of transporting means for transporting sheets to the tray, and the tray is moved down intermittently in accordance with the volume of sheets stacked thereon. Further, the image forming apparatus comprises first control means for commanding drive means to move the tray to a proper position, where the upper surface of the tray or the upper surface of sheets stacked thereon is positioned below the sheet ejection portion of the transporting means with a specified space, when a signal commanding an image forming operation is generated, and second control means for inhibiting the image forming operation while the drive means is in operation at the request of the first control means With this arrangement, whenever an image forming operation is about to start, the tray is moved to the proper position whether sheets remain on the tray or not. The image forming operation is kept standing by until the positioning of the tray is completed, and thereafter the image forming operation automatically starts. Therefore, even when sheets remain on the tray, an image forming operation is accepted, and the inconvenience is improved.

Further, an image forming apparatus according to the present invention comprises a tray for receiving sheets with an image, which is movable up toward and down away from a sheet ejection portion of transporting means for transporting sheets to the tray, and the tray is moved down intermittently in accordance with the volume of sheets stacked thereon. The image forming apparatus also comprises control means for commanding drive means to move the tray to a proper position, where the upper surface of the tray or the upper surface of sheets stacked thereon is positioned below the sheet ejection portion of the transporting means with a specified space, when the volume of sheets stacked on the tray is varied during an image forming operation. With this arrangement, the volume of sheets stacked on the tray continues being detected after the image forming operation started. For example, when the volume of stacked sheets is detected reduced, the tray is moved up to the proper position. Therefore, when sheets stacked on the tray are taken away therefrom during an image forming operation for any reason, the position of the tray is adjusted, and thereby the alignment of sheets on the tray is guaranteed.

Furthermore, an image forming apparatus according to the present invention comprises a transport path which has a first transport section for ejecting sheets onto a tray and a second transport section arranged upstream of the first transport section; first control means for reducing the speed of a sheet traveling in the first transport section from a first speed to a second speed when the sheet is about to be ejected from the transport means to the tray; and second control means for increasing the speed of a sheet traveling in the first transport section from the second speed to a third speed when the next sheet is detected traveling in the second transport section during the operation of said first transport section at the second speed. With this arrangement, sheets are ejected to the tray at a comparatively low speed. Accordingly, sheets will not be out of alignment on the tray. When a sheet slips during transportation, the timing of the slow-down delays, and the next sheet comes into the transport path. However, in such a case, the slow-down is canceled, and the first transport section is started operating at the third speed, therefore preventing a paper jam. Additionally, it is preferable that the third speed is the same as the first speed.

BRIEF DESCRIPTION OF THE DRAWINGS

These and other objects and features of the present invention will become apparent from the following description taken in conjunction with the preferred embodiment thereof with reference to the accompanying drawings, in which.

the drawings show an embodiment of an image forming apparatus according to the present invention.

DETAILED DESCRIPTION OF THE PREFERRED EMBODIMENT

An embodiment of an image forming apparatus according to the present invention is described below referring to the accompanying drawings.

General Constitution Including the Copying Machine

Figure 1:
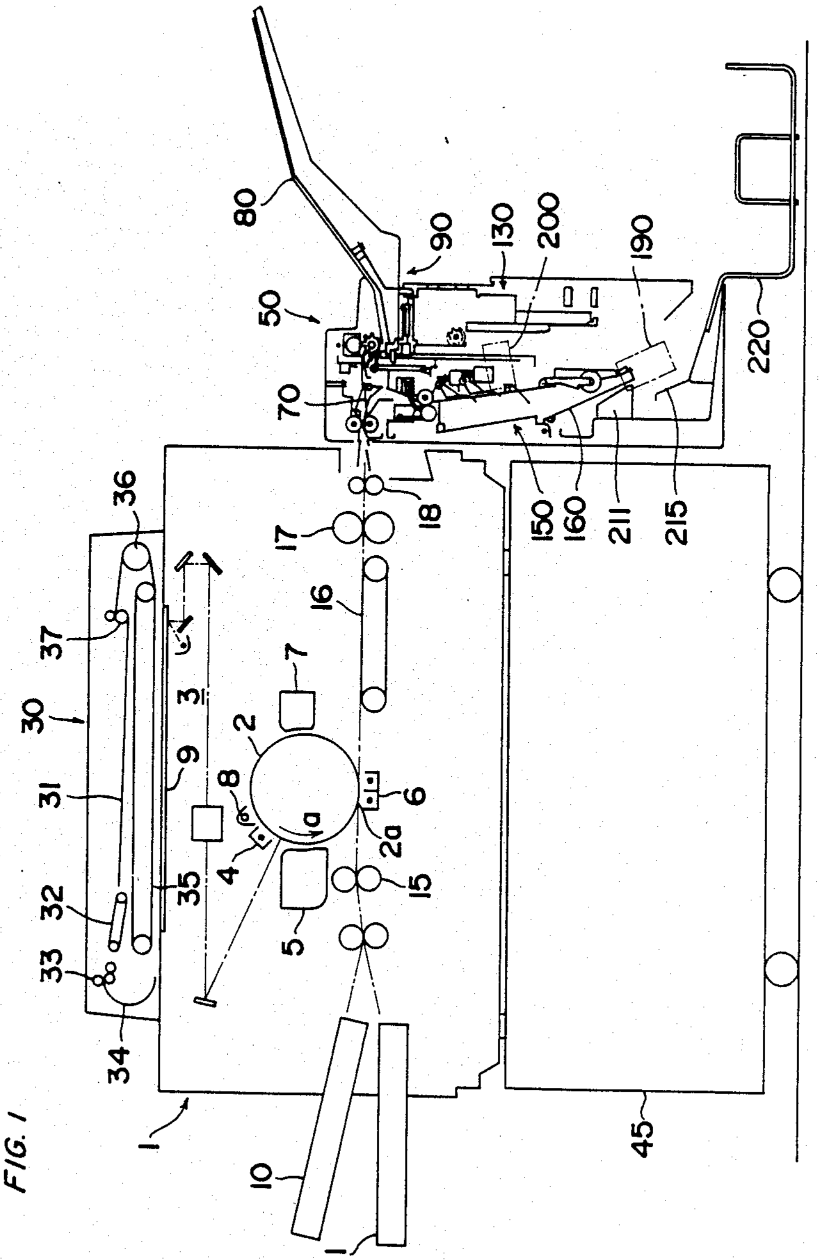
FIG. 1 is a schematic block diagram including a copying machine.

First, the general constitution including a copying machine 1 is described referring to FIG. 1.

The copying machine 1 is mounted on a desk 45, and a recirculating document handling device 30 (which is hereinafter abbreviated to RDH) is disposed on the upper surface thereof. In the center of the copying machine 1, a photosensitive drum 2 which is capable of rotating in the direction of the arrow (a) is disposed. Around the drum 2, elements for image forming such as an optical system 3, an electric charger 4, a developing device 5, a transfer charger 6, a cleaning device 7, an eraser lamp 8 and so on are arranged. These elements and the operation of the elements are so well-known that the detailed description of them is omitted.

Copying paper which is loaded in automatic paper feeder cassettes 10 and 11 is fed sheet by sheet selectively from the cassette 10 or 11. A sheet of copying paper is transported to a transfer section 2*a* by a pair of timing rollers 15, synchronized with a toner image on the circumferential surface of the photosensitive drum 2. After the transfer operation, the sheet is supplied to a fixing device 17, where the toner image is fixed on the sheet, by a conveyer belt 16, and then the sheet is ejected therefrom by a pair of ejection rollers 18. At that time, the sheet is detected by a sensor SE1 (refer to FIG. 2) disposed immediately before the ejection rollers 18.

The RDH 30 generally comprises a document tray 31, a document feed belt 32, a pair of document feed rollers 33, a turn-over guide plate 34, a transport belt 35, a turn-over roller 36 and a pair of ejection rollers 37. The RDH 30 transports a set of documents one by one in order of page starting with the last page so that the set of documents can circulate. A set of documents should be placed on the tray 31 with the back of the last page facing to the surface of the tray 31, so that the documents are drawn out one by one in order from the last page by the rotation of the document feed belt 32 and fed between the transport belt 35 and a document deck glass 9 through the pair of document feed rollers 33 and the turn-over guide plate 34. Next, the document is set at a specified position on the document deck glass 9 by the travel of the transport belt 35 to be exposed by the conventional optical system 3. After the image exposure, the document is transported by the transport belt 35 from the document deck glass 9 toward the right side in FIG. 1, where the document is turned over by the turn-over roller 36, and ejected by the pair of ejection rollers 37 onto a stack of documents on the tray 31 with the surface having an image upward.

The number of documents and the number of copy sets to be made can be entered with input means (ten-key) on a control panel not shown in the drawings. Each time one cycle of copying operation for one set of documents is completed, a sheet tray 80 is shifted as described later, or the documents are circularly transported as described above to repeat cycles of copying operation the same number of times as the number of copy sets entered with the input means, the copying operation being discontinued during a stapling operation and a stamping operation.

in the finisher unit 50, sheets ejected from the copying machine 1 are selectively stacked on the sheet tray 80 or stored in a stapling tray 150 to be aligned and stapled by a stapler 190. Accordingly, in making a plurality of copy sets finished with the stapling operation and the stamping operation with use of the RDH 30, one set of copied sheets are transported and stored in the stapling tray 150. After a one cycle completion signal is produced from the copying machine 1, and the last sheet of the copy set is aligned, the stapler 190 and the stamp 200 are operated to staple the copied sheets and stamp on the set. The stapled set is stacked and stored in a stack box 220.

Constitution of the Finisher Unit

Next, the constitution of the finisher unit 50 is hereinafter described referring to FIGS. 2 through 11.

This finisher unit 50 is mainly composed of rollers 60 and 61 for providing copied sheets entering the finisher unit 50 with transporting force, a diverting member 70 for diverting the travel of sheets, the sheet tray 80, a shift block 90 for shifting the sheet tray 80 in a direction perpendicular to that of the sheet ejection each time one copy set of an original set is stacked thereon, an elevate block 130 for lowering the sheet tray 80 intermittently to keep the falling rate of copied sheets down onto the sheet tray 80 and the stapling tray 150 with a stapling function and a stamping function.

The sheet receiving portion of the finisher unit 50 is provided with guide plates 62 and 63 oppose the pair of ejection rollers 18 as well as the driving roller 60 and the following roller 61. In the finisher unit 50, further, the diverting member 70, guide plates 64, 69, 91 and a sensor SE2 for detecting a copied sheet being ejected onto the sheet tray 80 are installed.

Figure 2:
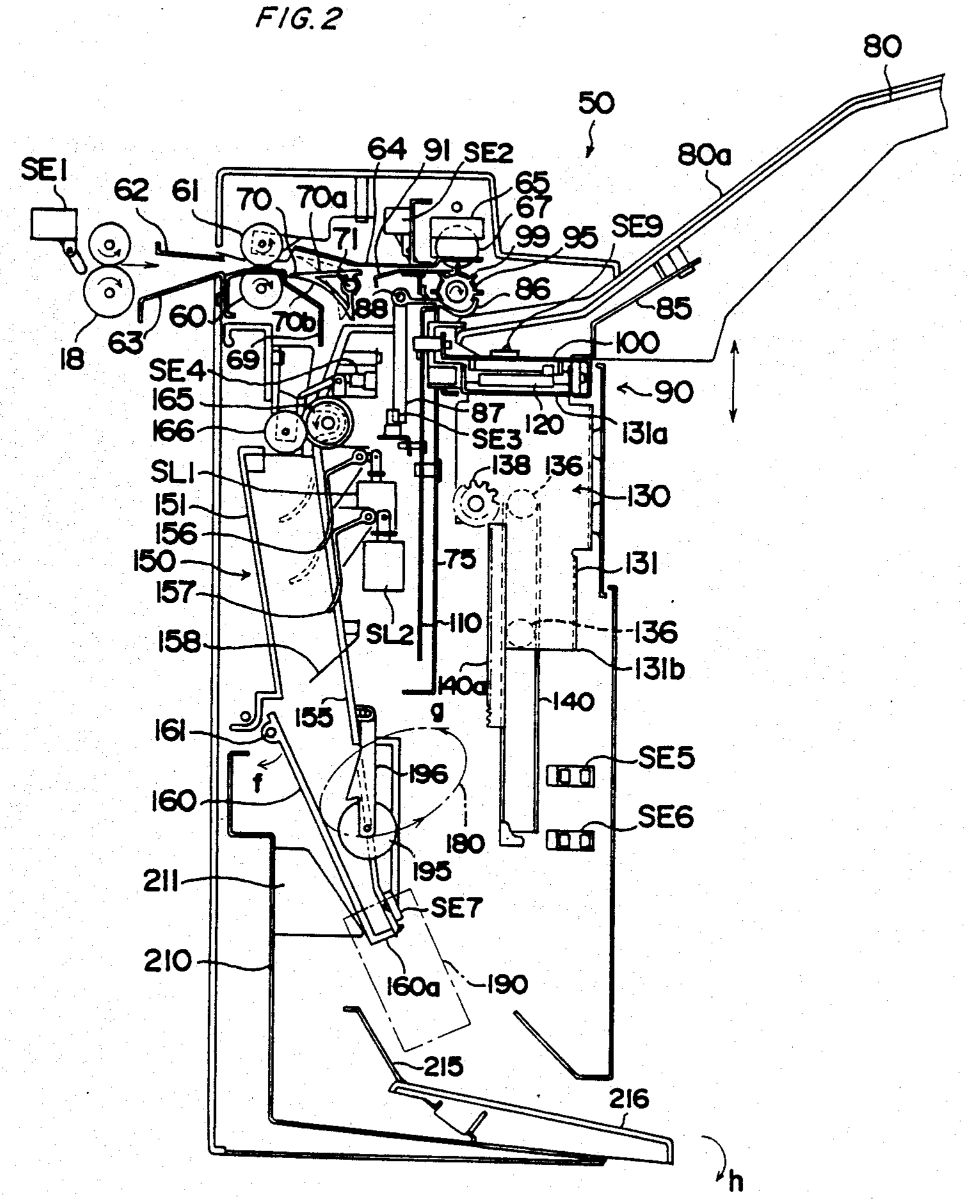
FIG. 2 is an internal construction showing a finisher unit.

The bill-shaped diverting member 70 is pivoted on a shaft 71, and the diverting member 70 is shifted from the position shown by the solid line to that shown by the dashed line in FIG. 2 when a solenoid not shown in the drawings is turned on. When the diverting member 70 is at the position shown by the solid line, its upper surface **70*a* guides sheets to the sheet tray 80, and when it is shifted to the position shown by the dashed line, its curved surface 70*b* guides sheets to the stapling tray 150**.

Figure 3:
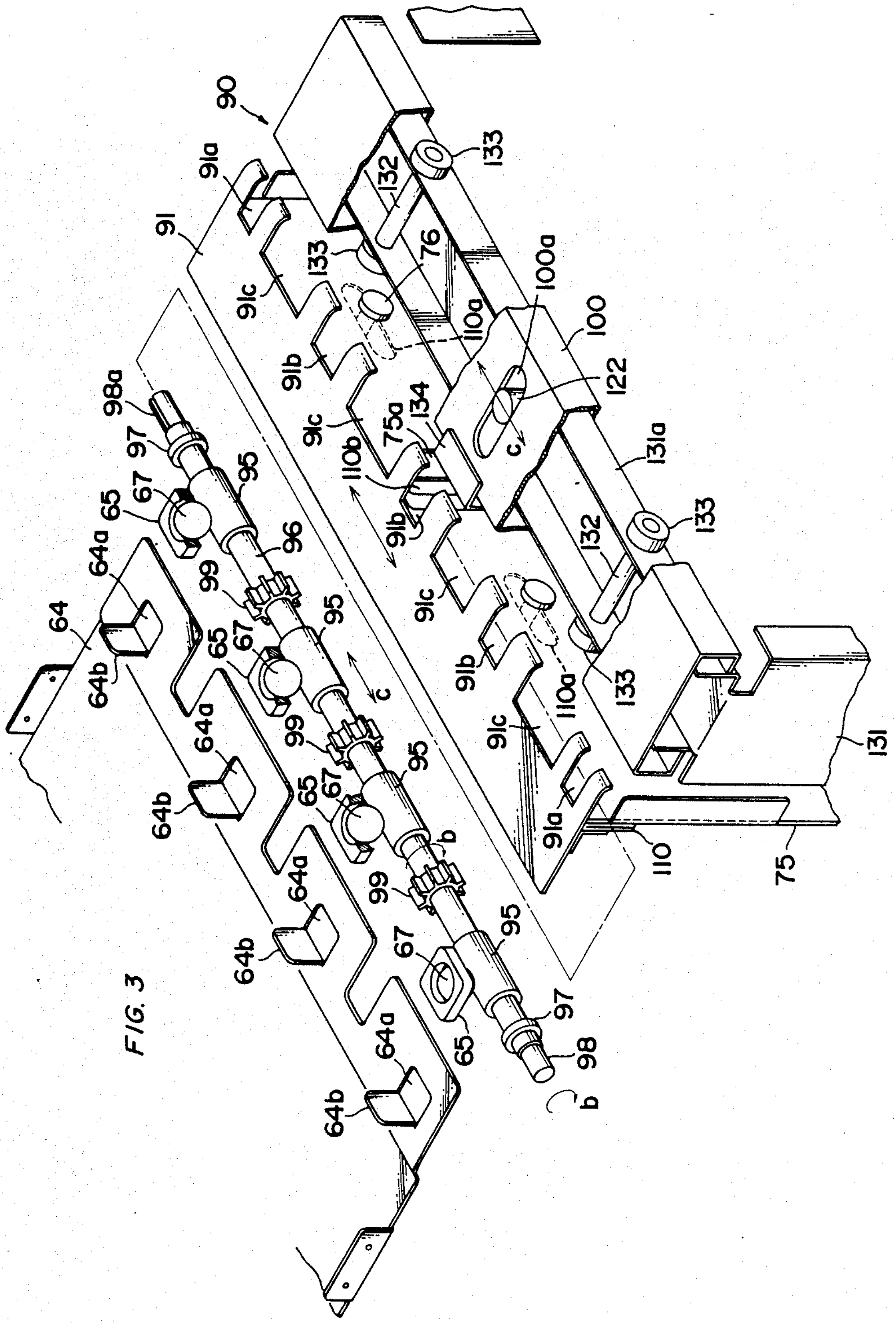
FIG. 3 is an exploded view in perspective showing ejection rollers and a shift block.

As shown in FIG. 3, copied sheets are ejected onto the sheet tray 80 by ejection rollers 95 and balls 67, and the ejected sheets are aligned by paddle wheels 99 which are disposed on the same shaft as the ejection rollers 95 are. The paddle wheels 99, which are equipped with radially-arranged flexible blades, are rotated in the direction of the arrow (b) and provide transporting force in the direction reverse to that of the sheet ejection for a sheet ejected onto the sheet tray 80 at the trailing edge. Accordingly, the trailing edge of the sheet is pressed against a fixed back plate 75, and thereby the sheet is aligned.

In the sheet ejecting operation, the transportation system such as the ejection rollers 95 is reduced in speed immediately before the trailing edge of a sheet passes through the nipping portion formed of the ejection rollers 95 and the balls 67, that is, the transportation system slows down immediately after the trailing edge of a sheet is detected by the sensor SE2 until the sheet is placed on the sheet tray 80. The transportation system in the finisher unit 50 is predetermined to operate at the same speed as that in the copying machine 1. However, if copied sheets are ejected onto the sheet tray 80 maintaining the speed, the sheets may jump out, which results in disorder of the sheets. As a prevention of such a trouble, in this embodiment, the transportation system in the finisher unit 50 is reduced in speed immediately before the sheet ejection. However, if the next sheet comes into the finisher unit 50 while the former sheet is being transported at a low speed, for example, if the timing of the slow-down delays on account of a slip of the former sheet, there is a fear of a paper jam because of the speed difference of the transportation systems between the copying machine 1 and the finisher unit 50. Therefore, when the next sheet comes into the finisher unit 50 during the low speed transporting, the slow-down is canceled, and the transportation system gains back to high in speed.

In this embodiment, the sheet tray 80 is shifted at a specified timing to divide copied sheets into sets. Accordingly, the paddle wheels 99 which always touch the trailing edge of an ejected sheet need to be shifted together with the sheet tray 80 in order not to put the sheets out of alignment. So, the paddle wheels 99 and the ejection rollers 95 are constructed so as to be shifted in a body. That is, the paddle wheels 99 and the ejection rollers 95 are fixed to a cylindrical shaft 96, and the shaft 96 is loosely disposed to a shaft 98 which is rotatably disposed to a frame not shown in the drawings. The shaft 98 can be rotated in the direction of the arrow (b) by a transport motor not shown in the drawings, and a key way **98*a* formed on the shaft 98 is engaged with key 97*a* shown in FIG. 5 disposed on each of ring shaped stoppers 97 fixed to the both ends of the shaft 96. Accordingly, the paddle wheels 99 and the ejection rollers 95 are driven to rotate in the direction of the arrow (b) in a body and can be shifted in the direction of the arrow (c). The stoppers 97 engage with notches 91*a* on the bottom guide plate 91 so that the bottom guide plate 91 is shifted in the direction of the arrow (c) together with the shift block 90 as described later. Thereby, the paddle wheels 99 and the ejection rollers 95 are shifted. Also, the paddle wheels 99 and the ejection rollers 95 are positioned at notches 91*b* and 91*c* on the bottom guide plate 91** respectively.

Figure 4:
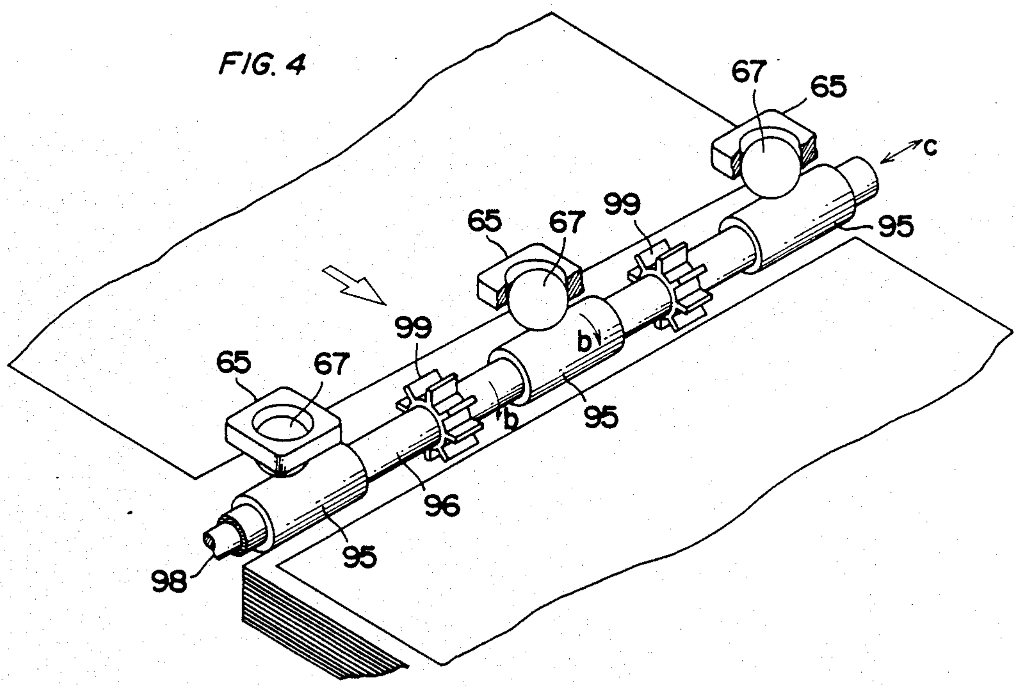
FIG. 4 is a perspective view showing sheet transport condition onto a sheet tray.
Figure 5:
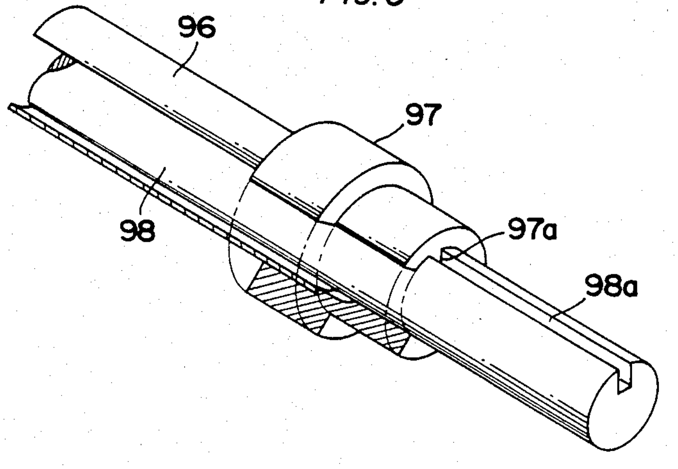
FIG. 5 is a perspective view showing a supporting mechanism for the ejection rollers and paddle wheels.

The balls 67 which can rotate freely weigh down the ejection rollers 95 respectively. That is, as shown in FIGS. 3 and 4, the balls 67 are positioned at openings **64*a* formed on a top guide plate 64 respectively and are prevented from moving by holders 65 which is fixed on tabs 64*b* cut out at the openings 64*a*. The balls 67 can accompany the rotation and the shifting of the ejection rollers 95 within the holders 65 so as to nip a sheet in cooperation with the ejection rollers 95 to feed the sheet onto the sheet tray 80**.

As shown in FIG. 2, the sheet tray 80 has a plurality of linear protrusions **80*a* extending in the direction of the sheet ejection on its surface and mounted on a shift frame 100 by a supporting plate 85. The back end of the sheet tray 80 touches the top portion of the fixed back plate 75, and an actuator 86 for a sensor SE3 is disposed above it. The actuator 86 is pivoted on a shaft 88 together with a lever 87, the bottom portion of the lever 87 usually intercepts the optical axis of the sensor SE3. When the number of sheets stacked on the sheet tray 80 increases, so that the sheets push up the actuator 86, the lever 87 is turned counterclockwise in FIG. 2 on the shaft 88 together with the actuator 86 so that the optical axis of the sensor SE3 which has been intercepted by the bottom portion of the lever 87 penetrates. Thus, the level of the upper surface of stacked sheets is detected, and the elevate block 130 is operated as described later so as to move down the sheet tray 80**.

Shift Block

Figure 6:
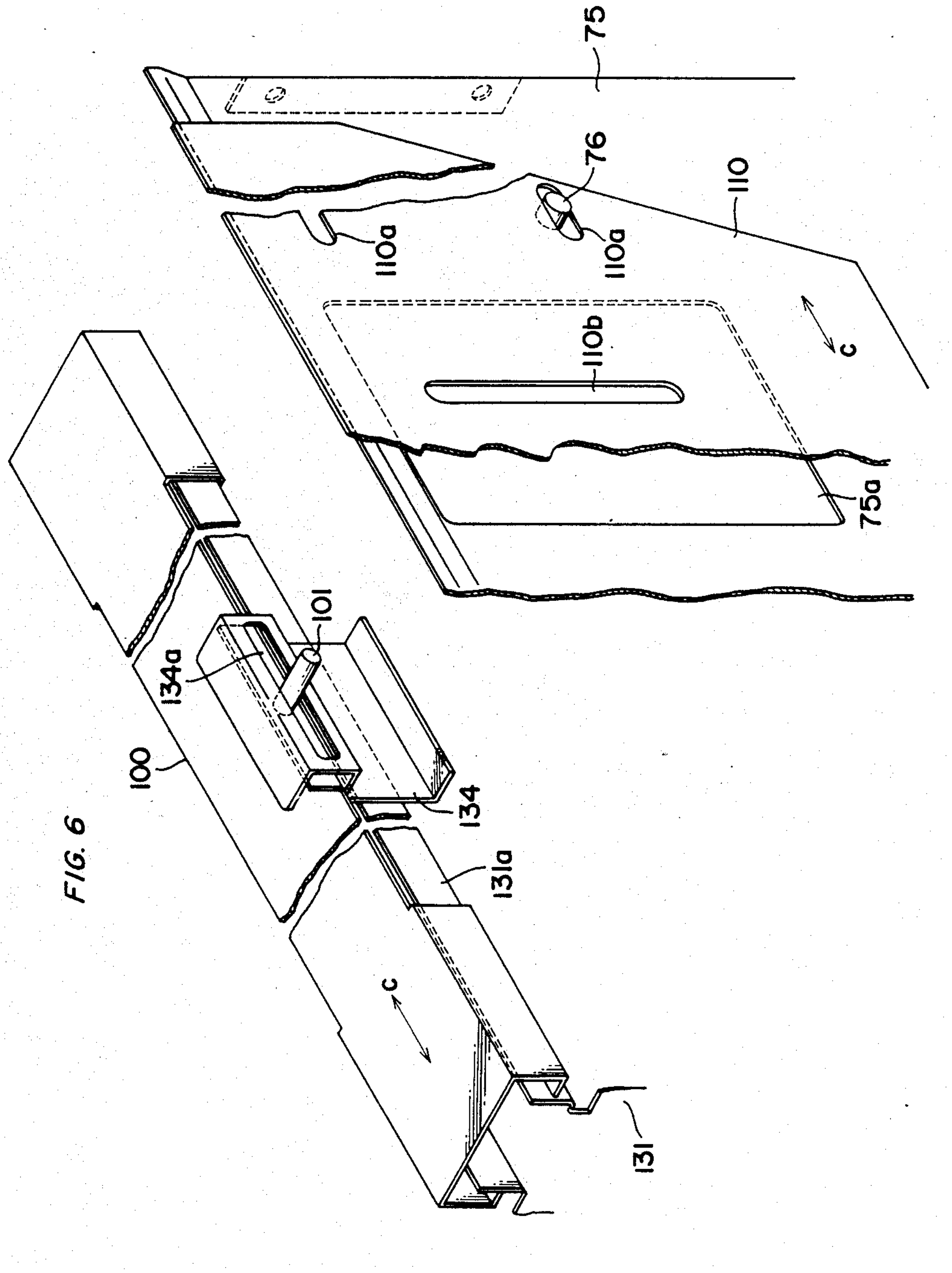
FIG. 6 is an exploded view in perspective showing the shift block.
Figure 8:
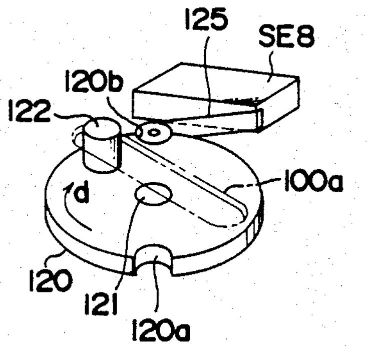
FIG. 8 is a perspective view showing a shift cam.

The shift frame 100 on which the sheet tray 80 is disposed, as shown in FIGS. 3 and 6, can be shifted in the direction of the arrow (c), guided by guide rollers 133 which are rotatably disposed on shafts 132 through a lateral guide portion **131*a* of an elevate frame 131. A cam 120 shown in FIG. 8 is set inside the lateral guide portion 131*a*, and a pin 122 fixed on an edge of the cam 120 engages with a long hole 100*a* on the shift frame 100. The cam 120 can be driven to pivot in the direction of the arrow (d) on a shaft 121 by a shift motor not shown in the drawings, and recesses 120***a* and 120*b* are so formed on the circumferential surface of the cam 120 that they are located with the point symmetry at an angle of 180 degrees to each other. Also, an actuator 125 for a sensor SE8 is so arranged that the actuator 125 makes contact with the circumference of the cam 120, and the sensor SE8 works each time the actuator 125 falls down to the recess 120*a* or 120*b* during the rotation of the cam 120.

With the above-described arrangement, one cycle of copying operation with use of the RDH 30 is completed; the last sheet of a copy set is ejected onto the sheet tray 80; the shift motor is started so as to rotate the cam 120 in the direction of the arrow (d); the actuator 125 falls down into the recess 120*a* or 120*b;* and then the shift motor is turned off. Thus and so, the cam 120 is rotated at an angle of 180 degrees intermittently each time a specified number of sheets are fed onto the sheet tray 80, and the shift frame 100 repeats to be reciprocated via the pin 122 together with the sheet tray 80 in the direction of the arrow (c), that is, in the direction of perpendicular to that of the sheet ejection.

Further, the fixed back plate 75 and a movable back plate 110 are mounted on the back side of the shift frame 100. The fixed back plate 75 is fixed to the main frame of the finisher unit 50, and it regulates the trailing edges of sheets stacked on the sheet tray 80. The movable back plate 110 functions to shift the ejection rollers 95, the sensor SE3 and the actuator 86 together with the sheet tray 80, and the bottom guide plate 91 is fixed to this movable back plate 110.

More specifically, as shown in FIGS. 3 and 6, three pins 76 disposed on the fixed back plate 75 engage with long holes 110*a* formed on the movable back plate 110 so that the movable back plate 110 can be shifted in the direction of the arrow (c). Also, a pin 101 disposed on the shift frame 100 engages with a long hole 110*b* vertically formed on the movable back plate 110 through a long hole 134*a* on a guide plate 134 fixed to the lateral guide portion 131*a* of the elevate frame 131 and an opening 75*a* on the fixed back plate 75 Accordingly, the movable back plate 110 can be shifted in the direction of the arrow (c) together with the shift frame 100 and the sheet tray 80 by the engagement of the pin 101 with the long hole 110*b*. Then, the movable back plate 110 is guided to be shifted by the engagement of the lateral long holes 110*a* with the pins 76. On the other hand, when the shift frame 100 is moved up and down together with the sheet tray 80 by the operation of the elevate block 130 as described later, the movable back plate 110 maintains its vertical position and does not move up and down since the pin 101 is guided by the long hole 110*b*. That is, the ejection rollers 95 and the actuator 86 maintain their vertical positions.

Elevate Block

The elevate block 130 supports the shift block 90 and is designed to lift up and down the sheet tray 80.

Figure 7:
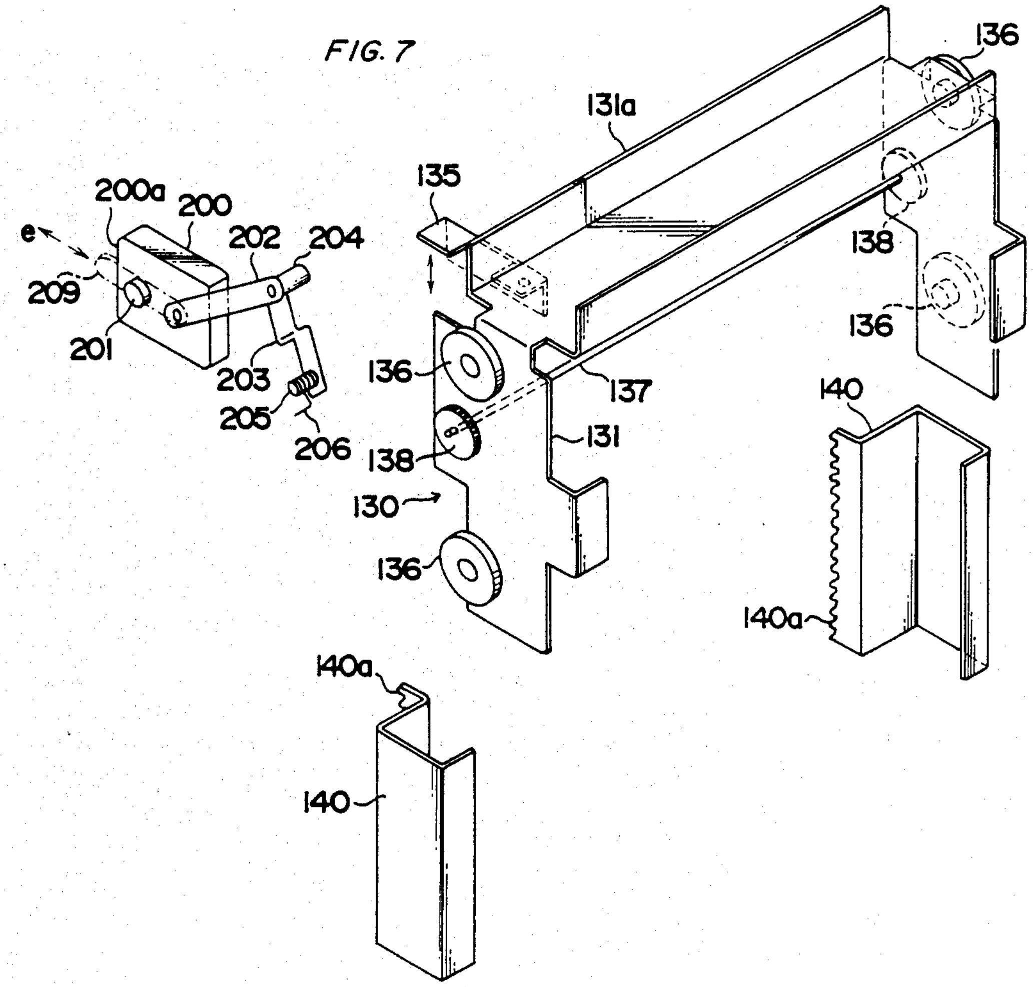
FIG. 7 is a perspective view showing an elevate block.

The elevate frame 131, which supports the shift frame 100 and enables it to be shifted, as shown in FIG. 7, can be lifted up and down by the engagement of rotatable rollers 136 disposed on the both sides of the elevate frame 131 with the inside of guide frames 140 fastened to the main frame not shown in the drawings. This elevate frame 131 also has pinions 138 fastened to a shaft 137. These pinions 138 gear to racks 140*a* formed on the elevate guide frames 140 and are driven to rotate by a reversible elevate motor not shown in the drawings. The elevate frame 131 is moved up and down together with the shIft frame 100 and the sheet tray 80 by the rotation of the pinions 138.

With the arrangement as described above, when sheets ejected and stacked on the sheet tray 80 increase in volume, and the upper surface of the sheets lifts up the actuator 86 to operate the sensor SE3, the elevate motor is driven forward. Then, the elevate frame 131 is moved down together with the sheet tray 80. When the actuator 86 comes back to its place by the descent of the sheets accompanying the descent of the sheet tray 80, so that the lever 87 intercepts the optical axis of the sensor SE3 again, the elevate motor is stopped, and accordingly the elevate frame 131 is stopped descending. Thus and so, since the sheet tray 80 is intermittently moved down according to the volume of sheets stacked thereon, the height which the trailing edge of a sheet falls down to the sheet tray 80 is automatically maintained within that calculated by the addition of the distance which the sheet tray 80 is moved down during the drive of the elevate motor to the distance between the nipping portion formed of the ejection rollers 95 and the balls 67 and the position where the actuator 86 detects the upper surface of the sheets. The copied sheets keep in alignment by the descent of the sheet tray 80 as well as by the aligning operation of the paddle wheels 99.

The position of the sheet tray 80 which is controlled by turning on and off the elevate motor in response to the detection of the volume of stacked sheets by the sensor SE3, that is, the position to which the sheet tray 80 is lowered one step from the position where the upper surface of the stacked sheets is detected by the sensor SE3 through the actuator 86 is hereinafter referred to as a proper position of the sheet tray 80.

When a copying operation is started in the copying machine 1, a control system of the finisher unit 50 judges whether the sensor SE3 is on or off. When it is off, which means that the sheet tray 80 is located below the proper position, the elevate motor is started running in the reverse direction to elevate the sheet tray 80 to the proper position. The copying machine 1 is kept from starting the copying operation until the sheet tray 80 finishes being elevated to the proper position. Further, after the copying operation was started, the control system of the finisher unit 50 judges whether the sensor SE3 is on or off all the time, so that the sheet tray 80 is controlled to be at the proper position. The control system will be described later.

As shown in FIG. 2, sensors SE5 and SE6 are disposed under the elevate block 130. These sensors SE5 and SE6 are actuated when a corner 131*b* of the elevate frame 131 intercepts the optical axes thereof. When the sensor SE5 is actuated, which means that the sheet tray 80 fills with sheets, a signal which indicates copied sheets are stacked over the capacity is produced and sent to the copying machine 1, and if necessary, it is warned that the sheets should be taken away from the sheet tray 80.

Additionally, the elevate frame 131 is moved down until its corner 131*b* is detected by the sensor SE6 so as to actuate the stamp 200.

Stamp Block

The constitution of a stamp block is hereinafter explained.

As shown in FIG. 7, the stamp 200, which stamps the words "SECRET", "CIRCULAR NOTICE" etc. on a bundle of copied sheets stored in the stapling tray 150 which will be described later, is actuated by the elevate frame 131. More specifically, the stamp 200 is set with its stamping surface 200*a* facing the arrow (e), and a pin 201 can be moved in the direction of the arrow (e) along a guide hole 209. This stamp 200 is linked with links 202 and 203 connected with each other by a pin 204, and the link 203 is pivoted on a pin 205 and always hung up by a torsion coil spring 206.

A tab 135 which is fixed on the lateral guide portion 131*a* of the elevate frame 131 presses the pin 204 by the descent of the elevate frame 131 to its lowest position, and the stamp 200 is moved in the direction of the arrow (e) to stamp on the bundle of sheets in the stapling tray 150. The stamping operation is controlled to be executed immediately after the stapling operation by the stapler 190 as described later. The sensor SE6 is actuated at the time of stamping operation, and accordingly the elevate motor is driven in the reverse direction to lift up the elevate frame 131 to its initial position. The links 202 and 203 relieved from the pressure of the tab 135 are moved up by the elasticity of the torsion coil spring 206 so that the stamp 200 is returned to its initial position.

Stapling Tray

The stapling tray 150, as shown in FIG. 2, comprises a base plate 151, a guide plate 155 and a stopper 160, and it stands with a slight inclination. The stopper 160 for regulating the bottom of sheets transported into the stapling tray 150 is pivoted on a shaft 161 and is connected with an ejection solenoid not shown in the drawings. The ejection solenoid is usually off, and accordingly the stopper 160 usually closes the bottom of the stapling tray 150 engaging with the bottom portion of the guide plate 155. When the ejection solenoid is turned on, the stopper 160 is turned in the direction of the arrow (f) on the shaft 161 to open the bottom of the stapling tray 150.

Figure 9:
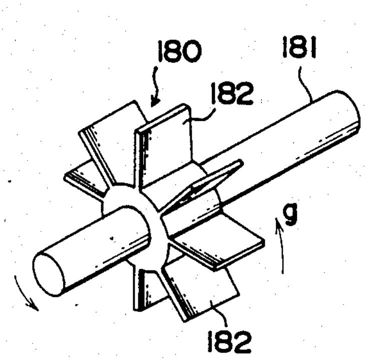
FIG. 9 is a perspective view showing a paddle wheel in a stapling tray.

Also, a paddle wheel 180 for aligning copied sheets transported into the stapling tray 150, the stapler 190, a guide roller 195 and a sensor SE7 for detecting the presence or the absence of sheets are disposed at the bottom portion of the stapling tray 150. The paddle wheel 180, as shown in FIG. 9, is equipped with radially-arranged flexible blades 182 around the shaft 181 and is driven to rotate in the direction of the arrow (g). The flexible blades 182 touch the surfaces of sheets to provide transporting force in a specified direction with each of the sheets so that every sheet can be properly transported into the stapling tray 150 and aligned.

The stapler 190 is a conventional electric type, wherein a receiver is disposed on the same plane as the stopper 160. The stopper 190 staples a corner of a bundle of sheets stored and aligned in the stapling tray 150.

The guide roller 195 which can be rotated is fixed to the bottom portion of a lever 196 which can swing and is hung from the guide plate 155, and this roller 195 is especially for preventing the leading edges of sheets stored in the stapling tray 150 from bulging.

On the other hand, the top portion of the guide plate 155, which is extended to the neighborhood of the diverting member 70, guides copied sheets to the stapling tray 150 in cooperation with the guide plate 69. Right above the stapling tray 150, transport rollers 165 and 166 for transporting copied sheets into the stapling tray 150 and a sensor SE4 for detecting the transported sheets are arranged.

Further, regulating levers 156 and 157 and a neutralizing brush 158 for copied sheets are provided for the guide plate 155. The regulating levers 156 and 157 come into the stapling tray 150 when solenoids SL1 and SL2 are turned on, and they can be moved to the positions shown by the dashed lines in FIG. 2 respectively to regulate the sheets not to lean toward the guide plate 155 and to prevent page disorder of the sheets. The regulating levers 156 and 157 are set at the positions where the top edges of sheets stored in the stapling tray 150 are regulated thereby, according to the size of the sheets.

Next, the constitution for ejecting the stapled sheets from the stapling tray 150 is explained.

Figure 10:
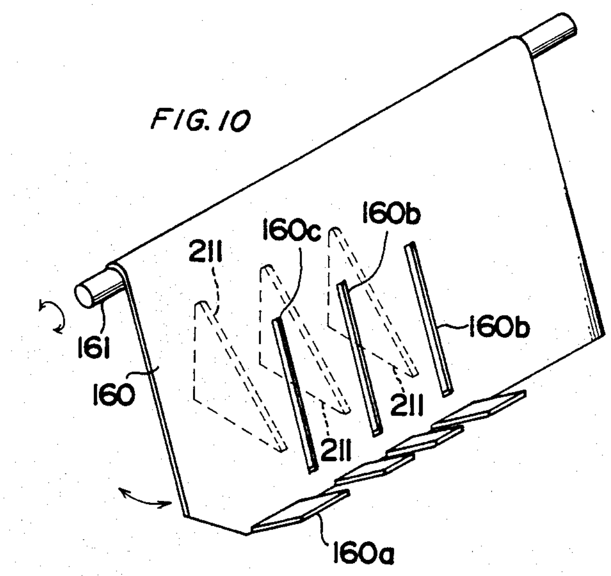
FIG. 10 is a perspective view showing a stopper of the stapling tray.

A frame 210 provided for the finisher unit 50 has tabs 211. The tabs 211 is so disposed that the tabs 211 face the bottom portion of sheets stored in the stapling tray 150, and as shown in FIG. 10, the stopper 160 has long holes 160*b* thereon corresponding to the tabs 211. Accordingly, when the stopper 160 is turned in the direction of the arrow (f) to open the bottom of the stapling tray 150, the tabs 211 protrude through the long holes 160*b* to regulate the bottom portion of the sheets. This arrangement prevents poor ejection which may be caused by the movement of the sheets attached to the bottom portion 160*a* in the direction of the arrow (f) when the bottom of the stapling tray 150 is opened. Accordingly, the regulating surfaces of the tabs 211 are inclined so as to guide the sheets to the direction of the ejection.

Figure 11:
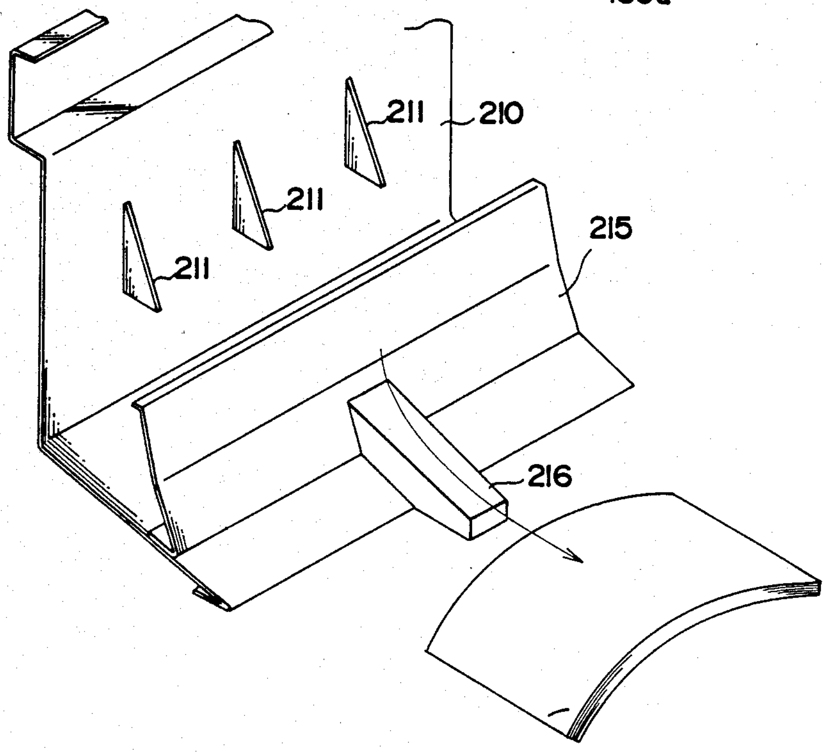
FIG. 11 is a perspective view showing a sheet ejection portion of the stapling tray.

Further, the stapled sheets are ejected into the stack box 220 (Refer to FIG. 1), guided by a guide plate 215 as shown in FIG. 11. At this moment, the sheets are apt to be curled in the direction of the arrow (h) (refer to FIG. 2) by the heat of the fixing device 17 in the copying machine 1, so that the sheets may be stored in the stack box 220 out of order only with the guidance of the guide plate 215. Accordingly, in this embodiment, a protrusion 216 is arranged at the center of the guide plate 215. This arrangement provides stiffness with the sheets being ejected to the stack box 220 so that the paper alignment in the stack box 220 is improved.

Control Panel and Operation Mode

Figure 12:
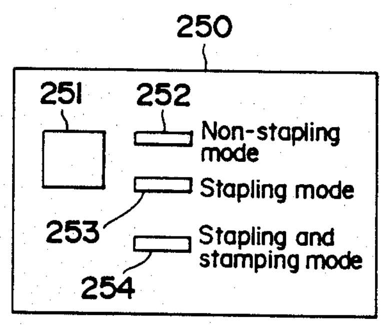
FIG. 12 is a plan view showing an operation panel of the finisher unit.

A control panel 250 of the finisher unit 50 is hereinafter described referring to FIG. 12. The control panel 250 comprises a mode selection key 251, an LED 252 for indicating a non-stapling mode, an LED 253 for indicating a stapling mode and an LED 254 for indicating a stapling and stamping mode. When a power switch is turned on, the operation mode is reset at the non-stapling mode. Thereafter, each time the mode selection key 251 is pressed, the operation mode is orderly changed to the stapling mode, to the stapling and stamping mode and then to the non-stapling mode, and the corresponding LEDs 252, 253 and 254 are accordingly lighted.

The non-stapling mode is an operation mode wherein copied sheets ejected from the copying machine 1 are stacked onto the sheet tray 80. In this mode, the diverting member 70 is maintained at the position shown by the solid line in FIG. 2 so that the sheets are ejected onto the sheet tray 80 through the ejection rollers 95 and the balls 67 and aligned by the rotation of the paddle wheels 99. Then, the elevate block 130 is operated as described above each time the sensor SE3 detects the upper surface of the sheets stacked on the sheet tray 80 so that the height from the upper surface of the sheets to the nipping portion formed of the ejection rollers 95 and the balls 67 is fixed.

The shifting of the sheet tray 80 by the operation of the shift block 90 is automatically performed when the number of copy sets is designated more than "2", whether the RDH 30 is used or not. In such a case, each time the sensor SE2 detects the last sheet of a copy set being ejected after one cycle of copying operation, the sheet tray 80 is shifted right or left for the division of copied sheets into sets.

The stapling mode is an operation mode wherein copied sheets ejected from the copying machine 1 are stored in the stapling tray 150 to be stapled with the stapler 190 and the stapled sheets are ejected therefrom and stacked in the stack box 220. In this mode, the diverting member 70 is set at the position shown by the dashed line in FIG. 2 so that the sheets are transported into the stapling tray 150 through the transport rollers 165 and aligned by the rotation of the paddle wheel 180. Then, when the last sheet of a copy set finishes being aligned, the stapler 190 is driven.

The stamping mode is an operation mode wherein the stamp 200 stamps on the first page of a bundle of copied sheets stored in the stapling tray 150. In this embodiment, the stamping mode is available only when the stapling mode is designated, and the stamping operation is executed right after the stapling operation. In this case, the elevate frame 131 is moved down together with the sheet tray 80 by the operation of the elevate block 130 until the corner 131*b* of the elevate frame 131 is detected by the sensor SE6, and then the stamp 200 is moved to stamp by the cooperation of the links 202 and 203 with each other.

Control Circuitry

Figure 13:
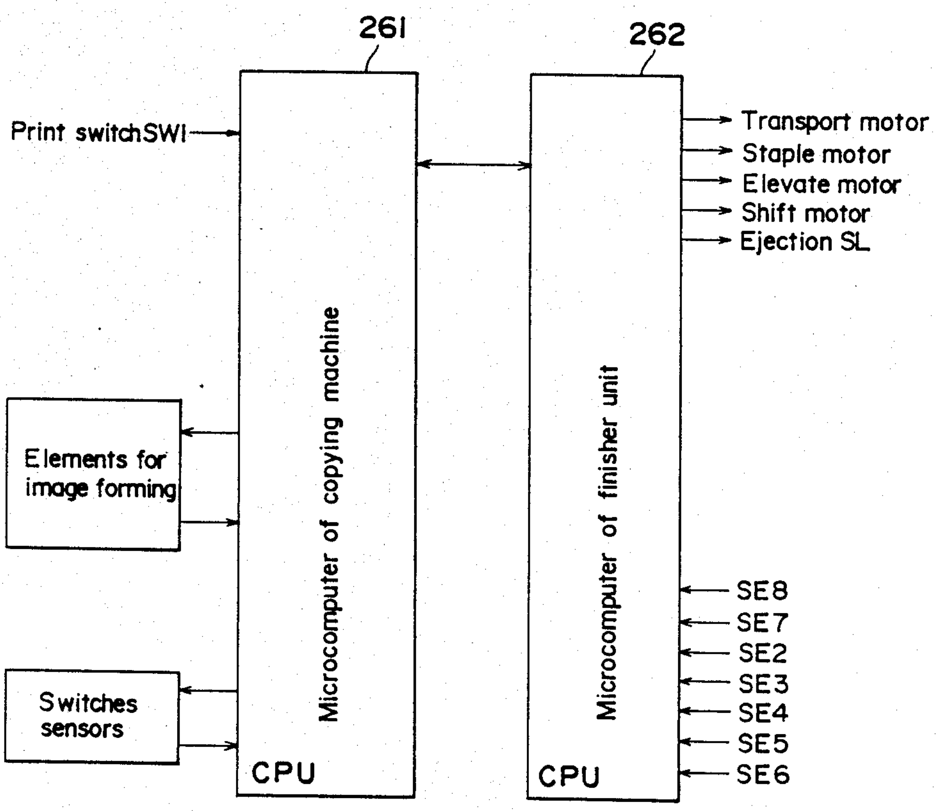
FIG. 13 is a block diagram showing a control circuitry.

FIG. 13 shows a control circuitry of the copying machine 1 and the finisher unit 50.

The control is executed mainly by a microcomputer (which is hereinafter referred to as a CPU) 261 of the copying machine 1 and a CPU 262 of the finisher unit 50. The CPU 261 is connected to all elements for image forming and many of the switches, the sensors, etc. The CPU 261 is connected to the transport motor, the staple motor, the elevate motor, the shift motor, the ejection solenoid, the sensors SE2 through SE8, etc. The CPUs 261 and 262 exchange signals with each other so as to execute the necessary processing.

Control Procedure

The control procedure of the finisher unit 50 based on the control circuitry is hereinafter explained.

In the following paragraphs, the term "on-edge" is defined as change in status where a switch, a sensor, a signal or the like changes from the off status to the on status. In contrast, the term "off-edge" represents change in status where a switch, a sensor, a signal or the like changes from the on status to the off status.

Figure 14:
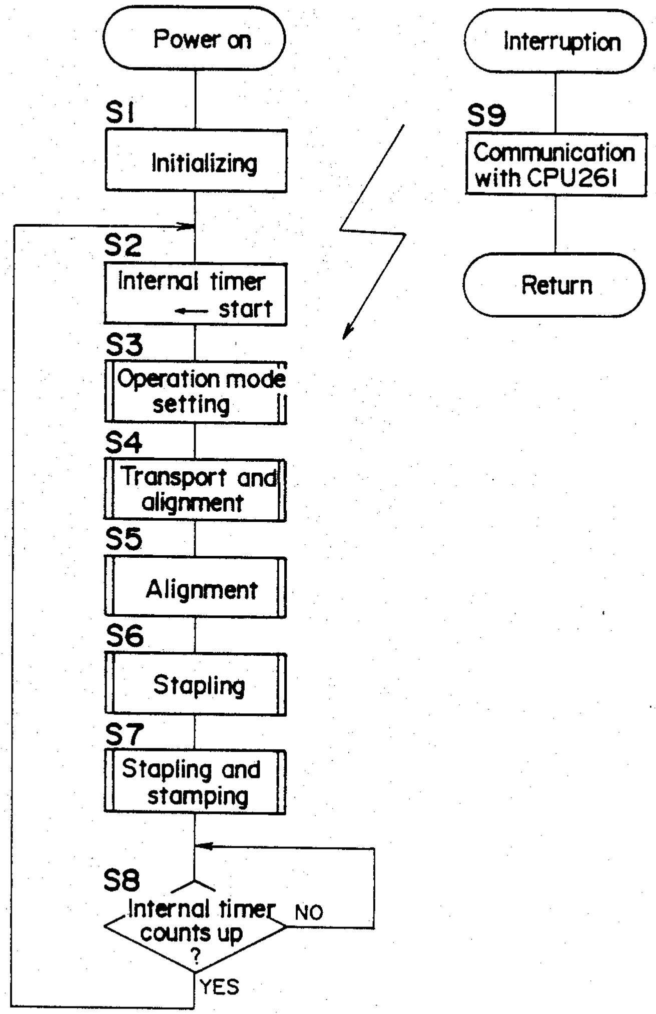
FIG. 14 is a flow chart showing a main routine of a CPU 262 controlling the finisher unit.

FIG. 14 shows a main routine which the CPU 262 of the finisher unit 50 performs.

When the CPU 262 is all reset, and the program is started, first, at step S1, a random access memory is cleared and every register is initialized to reset all devices at the initial mode. Next, an internal timer is started at step S2. The internal timer determines the time required for one cycle of this main routine, and the numerical value is predetermined at step S1.

Subsequently, subroutines to be executed at steps S3 through S7 are called and executed, and when the processes of all the subroutines are completed, it is confirmed at step S8 that the internal timer counts up the time, and then the processing returns to step S2. The counting with each timer in each subroutine is based on the time required for one cycle of this main routine.

Step S3 is a subroutine for the setting of the operation mode of the finisher unit 50 by an operator. Step S4 is a subroutine for the transport and alignment of copied sheets on the sheet tray 80 when the non-stapling mode is selected, and the detailed description thereof will be given later. Step S5 is a subroutine for the transport and storing of copied sheets in the stapling tray 150 and the alignment of each sheet therein when the stapling mode or the stapling and stamping mode is selected. Step S6 is a subroutine for the stapling operation to staple one set of copied sheets already aligned in the stapling tray 150 and the ejection of the bound paper into the stack box 220. Step S7 is a subroutine for the stamping on the bound paper with the stamp 200. The detailed description of the subroutines executed at the steps S5, S6 and S7 is omitted.

On the other hand, when a request for the interruption operation is produced from the CPU 261 of the copying machine 1 in the middle of the procedure of this main routine, the CPU 262 of the finisher unit 50 corresponds with the CPU 261 at step S9.

Figure 15:
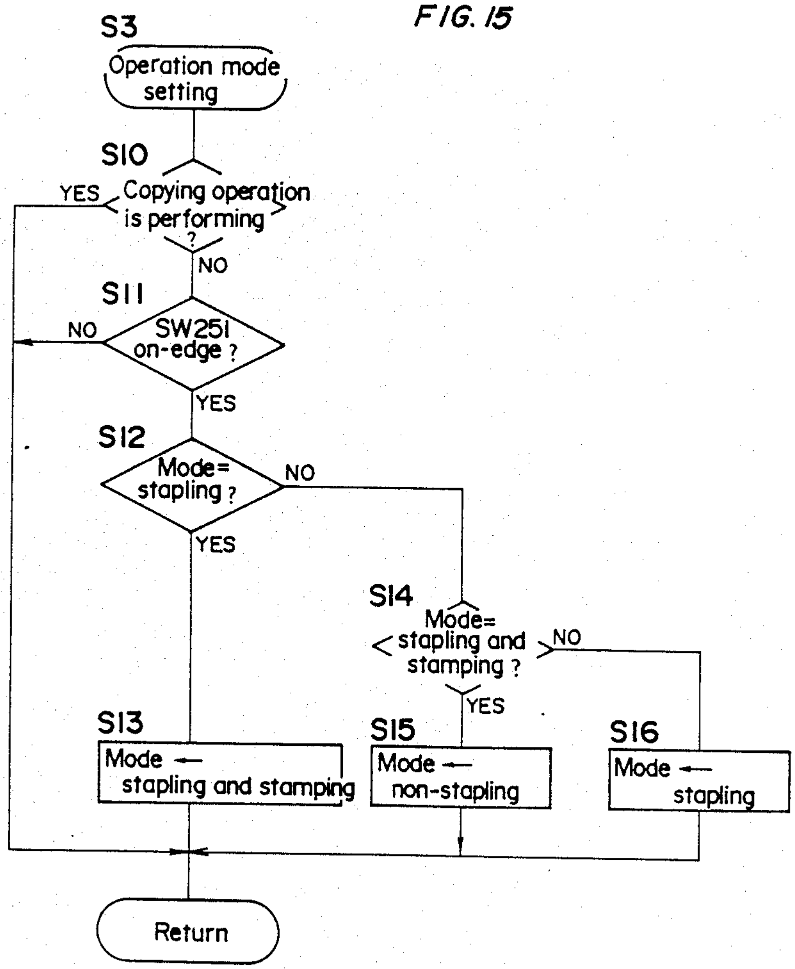
FIG. 15 is a flow chart showing a subroutine for the operation mode setting.
Figure 16:
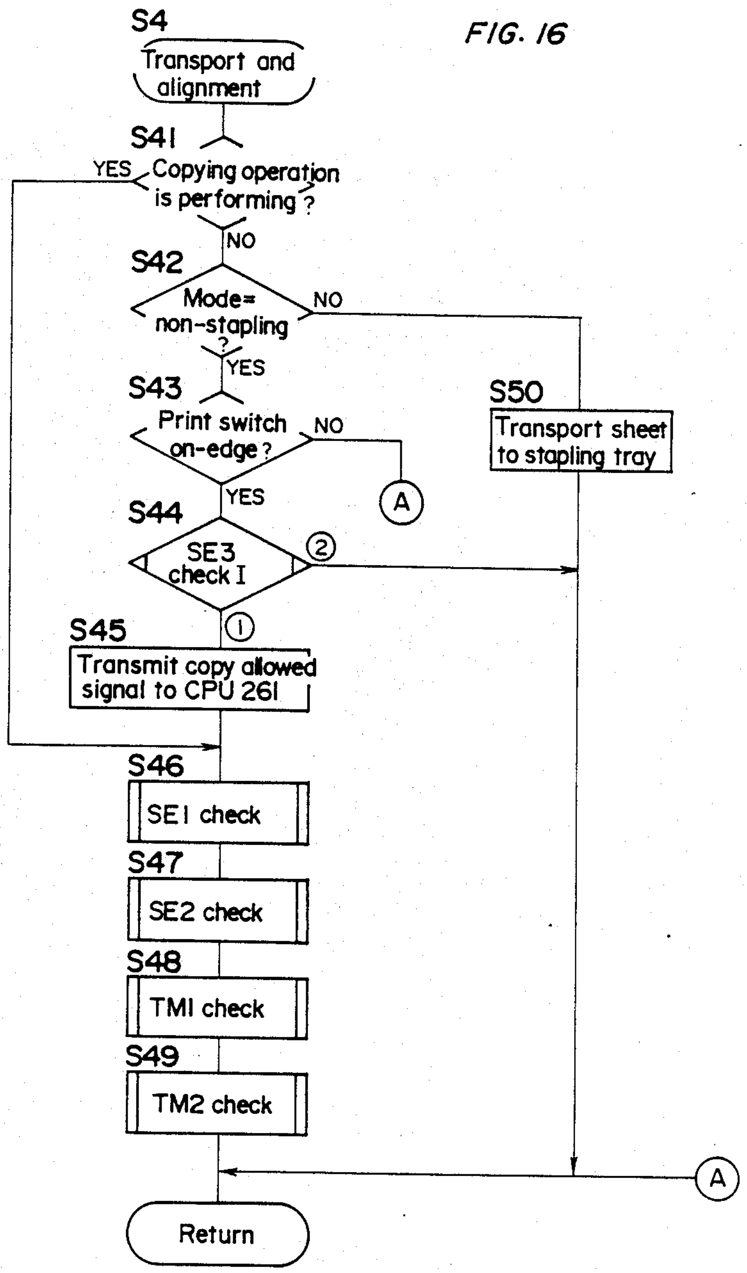
FIGS. 16, 17, 18, 19, 20, 21, 22 and 23 are flow charts showing subroutines for the transport/alignment.

FIG. 15 shows a subroutine for the operation mode setting to be executed at step S3.

After it is confirmed at step S10 that the copying machine 1 is not currently in operation, it is checked at step S11 whether the mode selection switch 251 is on-edge or not. When it is on-edge, it is checked at steps S12 and S14 whether the current operation mode is either the stapling mode or the stapling and stamping mode or neither.

When the operation mode is the stapling mode at this moment, at step S13, the LED 254 is lighted while the mode is changed to the stapling and stamping mode. When the operation mode is the stapling and stamping mode, at step S15, the LED 252 is lighted while the mode is changed to the non-stapling mode. When the operation mode is the non-stapling mode, that is, when both results at steps S12 and S14 are "NO", at step S16, the LED 253 is lighted while the mode is changed to the stapling mode.

FIGS. 16 through 23 show subroutines for the transport/alignment to be executed at step S4.

Figure 17:
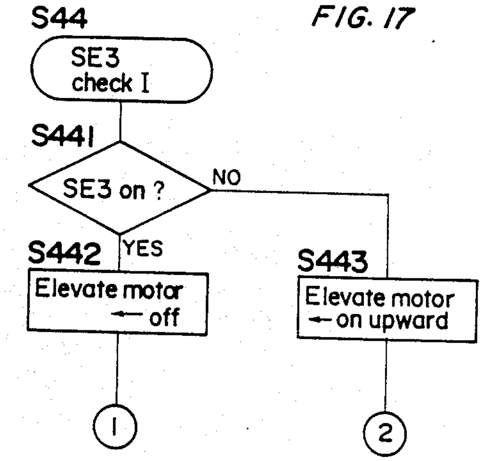

First, at step S41, it is checked whether the copying machine 1 is performing a copying operation or not, and when it is not performing a copying operation, it is checked at step S42 whether the non-stapling mode is designated as an operation mode. When another operation mode is designated, at step S50, the finisher unit 50 is controlled so that copied sheets ejected from the copying machine 1 can be transported to the stapling tray 150. On the other hand, when the non-stapling mode is designated, it is checked at step S43 whether the print switch SW1 of the copying machine 1 is on-edge. When the print switch SW1 is not on-edge, this subroutine is immediately completed. When the print switch SW1 is on-edge, the sensor SE3 is checked at step S44. FIG. 17 shows how to check the sensor SE3. At step S441, the sensor SE3 is checked whether on or not. When the sensor SE3 is not on, which means that the sheet tray 80 is not at the proper position, the elevate motor is turned on at step S443 to elevate the sheet tray 80 to the proper position. When the sheet tray 80 reaches the proper position, the actuator 86 and the lever 87 are turned counterclockwise, and thereby the sensor SE3 is turned on (YES at step S441). Then, the elevate motor is turned off at step S442, and the processing goes to step S45. At step S45, a copy allowed signal is produced and sent to the CPU 261 of the copying machine 1, and here the copying operation is allowed to start. Accordingly, the processing goes to step S46.

On the other hand, when it is judged at step S41 that the copying machine 1 is performing a copying operation at step S41, the processing goes to step S46 immediately. That is, the subroutine at step S44 for checking the sensor SE3 is executed only when a copying operation is about to start.

Figure 18:
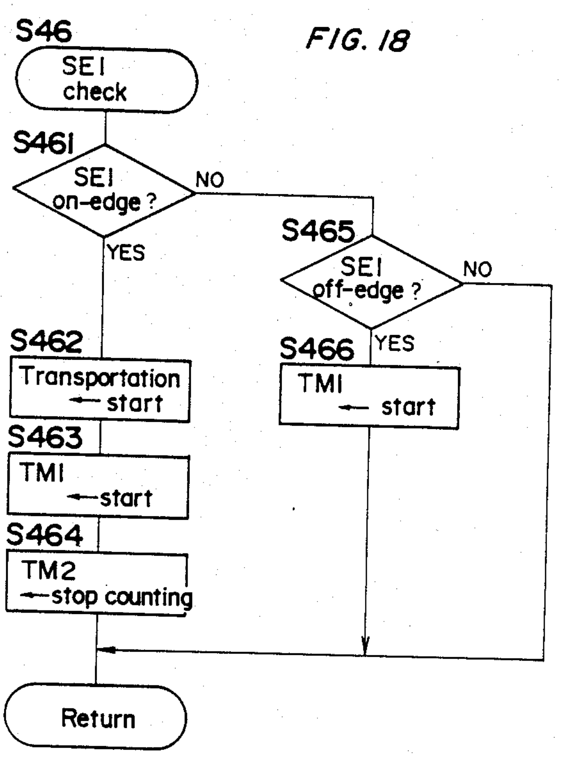

At step S46, the ejection sensor SE1 of the copying machine 1 is checked. FIG. 18 shows how to check the sensor 1. At step S461, the sensor SE1 is checked whether on-edge or not, that is, it is checked whether the leading edge of a sheet getting out of the copying machine 1 has reached the sensor SE1 or not. When the leading edge has reached the sensor SE1 whereby the sensor SE1 is on-edge, at step S462, the transport motor is driven to start the transportation of sheets in the finisher unit 50.

On the other hand, when the sensor SE1 is not on-edge, the sensor SE1 is checked at step S465 whether off-edge or not, that is, it is checked whether the trailing edge of a sheet has passed the sensor SE1 or not. When the trailing edge of the sheet has passed the sensor SE1 whereby the sensor SE1 is off-edge, at step S466, a timer TM1 is started, and then the processing returns to step S4 In the timer TM1, the time required for a sheet which has just passed through the sensor SE1 to be placed on the sheet tray 80 through the ejection rollers 95 and balls 67 is set.

Figure 24:
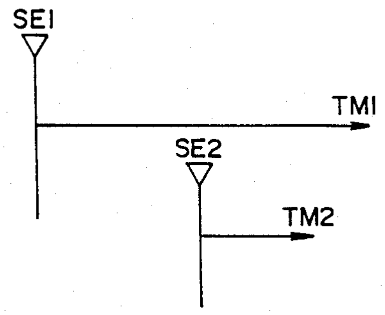
FIG. 24 is a time chart showing setting time of timers TM1 and TM2.

Also, at step S462, when the transportation of a sheet in the finisher unit 50 is started, the timer TM1 is started at step S463. At step S464, a timer TM2 stops counting the time. The timer TM2 is in charge of a time control for the slow-down of the transportation system so that a sheet will not jump out on the sheet tray 80. The timer TM1 is started at the time of starting the transportation of a sheet in the finisher unit 50, and immediately after that, the timer TM2 stops counting so that the transporting speed is returned to the high speed. If while the former sheet is being transported at a low speed, the next sheet comes into the finisher unit 50, there is a possibility of a paper jam on account of the transporting speed difference between the copying machine 1 and the finisher unit 50. Accordingly, as shown in FIG. 24, the time incorporated into the timer TM1 is longer than that of the timer TM2, and the timer TM2 always finishes counting earlier than the timer TM1.

Figure 19:
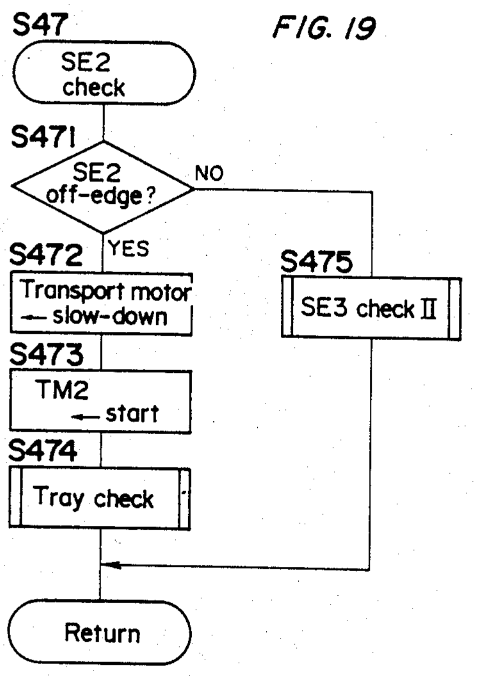

Next, the sensor SE2 is checked at step S47. FIG. 19 shows a check on the sensor SE2. At step S471, the sensor SE2 is checked whether off-edge or not, that is, it is checked whether the trailing edge of a sheet has passed the sensor SE2 or not. When the sensor SE2 is off-edge, at step S472, the transportation system is reduced in speed to slow down the travel of a sheet. At the same time, the timer TM2 which counts the time for the slow-down is started at step S473.

Figure 20:
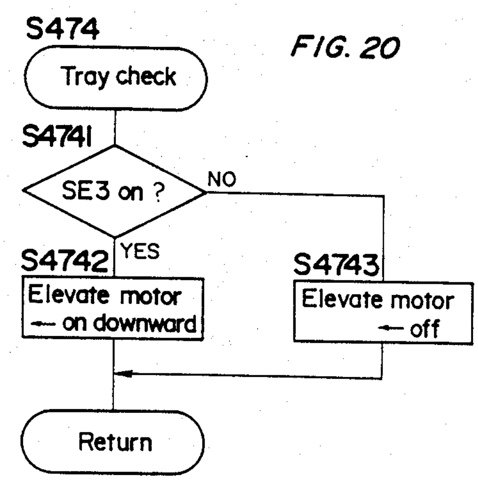
Figure 21:
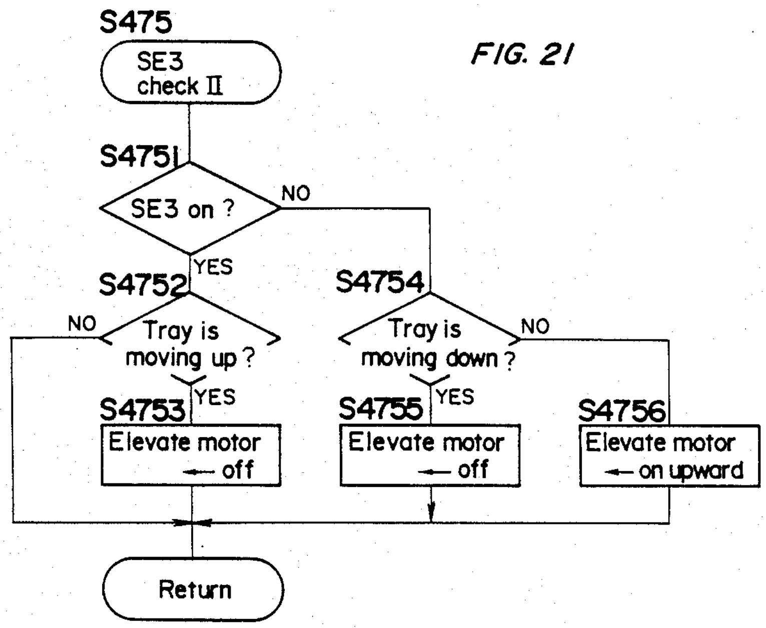

Next, the vertical position of the sheet tray 80 is checked at step S474. FIG. 20 shows a check on the sheet tray 80. At step S4741, the sensor SE3 is checked whether on or not. When it is on, which means that too many copied sheets are stacked on the sheet tray 80 for the current position of the sheet tray 80, at step S4742, the elevate motor is turned on to lower the sheet tray 80 to the proper position. When the sheet tray 80 reaches the proper position, the actuator 86 and the lever 87 is turned clockwise, and thereby the sensor SE3 is turned off (NO at step S4741). Then, the elevate motor is turned off at step S4743. Thus, each time a sheet is ejected onto the sheet tray 80, the sheet tray 80 is checked whether to be at the proper position or not, and when it is not at the proper position, the sheet tray 80 is lowered to the proper position.

On the other hand, when it is judged at step S471 that the sensor SE2 is not off-edge, the sensor SE3 is checked at step S475. If some or all of sheets stacked on the sheet tray 80 are taken away therefrom during a copying operation, the falling rate of the successive sheets down onto the sheet tray 80 will be larger. Accordingly, at this step, the vertical position of the sheet tray 80 is checked, and the sheet tray 80 is moved to the proper position if necessary.

First, at step S4751, the sensor SE3 is checked whether on or off. When the sensor SE3 is on, it means that the sheet tray 80 is at the proper position or above the proper position. Then, when it is judged at step S4752 that the sheet tray 80 is moving up, the elevate motor is turned off at step S4753. However, when it is judged at step S4752 that the sheet tray 80 is moving down, the operation is continued because the sheet tray 80 is getting to the proper position. When the sensor SE3 is judged to be off at step S4751, it means that the sheet tray 80 is at the proper position or below the proper position. Accordingly, when it is judged at step S4754 that the sheet tray 80 is moving down, the elevate motor is turned off at step S4755 When the sheet tray 80 is not moving down, it indicates such a situation as sheets on the sheet tray 80 were taken away therefrom. Accordingly, the elevate motor is turned on at step S4756 so as to set the sheet tray 80 at the proper position. The elevate motor continues running until the sensor SE3 is turned on (YES at step S4751).

Figure 22:
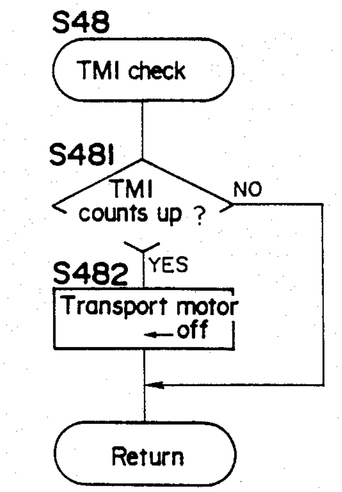

Next, the timer TM1 is checked at step S48. FIG. 22 shows a check on the timer TM1 After it is confirmed at step S481 that the tImer TM1 has counted up the time, which means that a copied sheet is transported onto the sheet tray 80, the transport motor is turned off at step S482.

Figure 23:
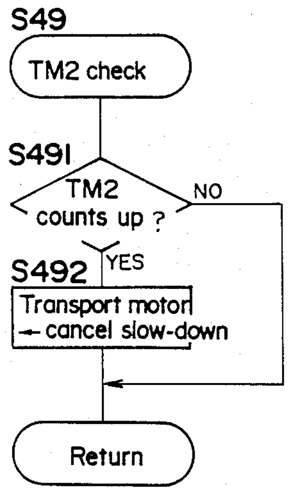

Next, the timer TM2 is checked at step S49. FIG. 23 shows a check on the timer TM2. After it is confirmed at step S491 that the timer TM2 has counted up the time, the slowdown of the transport motor is canceled at step S492 so that the transporting speed can be gained back.

Although the present invention has been described in connection with the preferred embodiment thereof, it is to be noted that various changes and modifications are apparent to those who are skilled in the art. Such changes and modifications are to be understood as included within the scope of the present invention as defined by the appended claims, unless they depart therefrom.

For example, the ejection rollers 95 and the balls 67 are arranged at the end of the path to the sheet tray 80, but pairs of rollers can be replaced for them like in conventional apparatuses.

Also, the sheet tray 80 can be combined with a sorter unit for distributing and storing sheets therein as well as a stapling unit.

What is claimed is:

1. An image forming apparatus comprising:
means for forming an image on a sheet;
means for generating a signal commanding said image forming means to perform an image forming operation;
a tray for receiving sheets, which is movable up and down;
means for transporting sheets ejected from said image forming means to said tray;
drive means for moving up and down said tray toward and away from a sheet ejection portion of said transporting means;
first control means for commanding said drive means to move said tray to a proper position, where the upper surface of said tray or the upper surface of sheets stacked thereon is positioned below the sheet ejection portion of said transporting means with a specified space, when said commanding means generates a command signal to start an image forming operation: and
second control means for inhibiting the image forming operation while said drive means is in operation at the request of said first control means.

2. An image forming apparatus as claimed in claim 1, further comprising means for detecting whether said tray is at the proper position or not, wherein said second control means further cancels the inhibition of the image forming operation when said tray position detect means generates a signal indicating that the tray is at the proper position.

3. An image forming apparatus comprising:
means for forming an image on a sheet;
means for generating a signal commanding said image forming means to perform an image forming operation;
a tray for receiving sheets, which is movable up and down;
means for transporting sheets ejected from said image forming means to said tray;
drive means for moving up and down said tray toward and away from a sheet ejection portion of said transporting means;
means for detecting the volume of sheets stacked on said tray;
first control means for commanding said drive means to move down said tray in accordance with the volume of sheets stacked on said tray; and
second control means for commanding said drive means to move said tray to a proper position, where the upper surface of said tray or the upper surface of sheets stacked thereon is positioned below the sheet ejection portion of said transporting means with a specified space, when the volume of sheets stacked on said tray is varied during an image forming operation.

4. An image forming apparatus as claimed in claim 3, wherein said sheet volume detection means includes a sensor which detects whether the upper surface of said tray or the upper surface of sheets stacked thereon is positioned below the sheet ejection portion of said transporting means with a specified space or not.

5. An image forming apparatus comprising:
means for forming an image on a sheet;
a tray for receiving sheets;
a transport path for leading sheets ejected from said image forming means to said tray, which includes a first transport section for ejecting the sheets onto said tray and a second transport section arranged upstream of said first transport section;
means for detecting a sheet traveling in said transport path
first control means for reducing the speed of a sheet traveling in said first transport section from a first speed to a second speed when the sheet is about to be ejected from said first transport section to said tray; and
second control means for increasing the speed of a sheet traveling in said first transport section from the second speed to a third speed when the next sheet is detected traveling in said second transport section during the operation of said first transport section at the second speed.

6. An image forming apparatus as claimed in claim 5, wherein the third speed is the same as the first speed.

7. An image forming apparatus as claimed in claim 5, said sheet detect means has a first sensor between said first transport section and said second transport section and a second sensor at the upstream of said second transport section.

8. An image forming apparatus as claimed in claim 5, wherein said first transport section and said second transport section have rollers respectively.

9. An image forming apparatus as claimed in claim 8, wherein said first transport section includes a pair of rollers for ejecting sheets to said tray, and said second transport section includes a pair of rollers for receiving sheets ejected from said image forming apparatus.

10. An image forming apparatus as claimed in claim 9, wherein said first control means reduces the speed of said pair of ejection rollers to the second speed immediately before the trailing edge of a sheet passes said pair of ejection rollers, and said pair of ejection rollers maintains the second speed until the sheet is ejected onto said tray.

* * * * *